US012304731B2

(12) United States Patent
Hund, Jr.

(10) Patent No.: US 12,304,731 B2
(45) **Date of Patent: *May 20, 2025**

(54) GRABBER FOR A FRONT LOADER REFUSE VEHICLE

(71) Applicant: The Heil Co., Chattanooga, TN (US)

(72) Inventor: Henry Michael Hund, Jr., Cedar Bluff, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,969

(22) Filed: Feb. 2, 2024

(65) Prior Publication Data

US 2024/0246758 A1 Jul. 25, 2024

Related U.S. Application Data

(63) Continuation of application No. 17/673,542, filed on Feb. 16, 2022, now Pat. No. 11,945,647, which is a (Continued)

(51) Int. Cl.
*B65F 3/04* (2006.01)
*B65F 3/02* (2006.01)

(52) U.S. Cl.
CPC ................ *B65F 3/041* (2013.01); *B65F 3/04* (2013.01); *B65F 2003/023* (2013.01); (Continued)

(58) Field of Classification Search
CPC .................. B65F 3/04; B65F 2003/023; B65F 2003/0276; B65F 2003/0279; B65F 2003/0283
See application file for complete search history.

(56) References Cited

U.S. PATENT DOCUMENTS 2,069,499 A 2/1937 Marin et al.
3,112,834 A 12/1963 Dempster et al.
(Continued)

FOREIGN PATENT DOCUMENTS

CA 2358737 4/2002
CA 2503314 4/2002
(Continued)

OTHER PUBLICATIONS

AMRoll.com [online], "Thrust Bearings," available on or before Feb. 21, 2016, via Internet Archive: Wayback Machine URL <https://web.archive.org/web/20160221141948/https://www.amroll.com/thrust-bearings.html>, retrieved on Sep. 12, 2022, URL <https://www.amroll.com/thrust-bearings.html>, 5 pages.
(Continued)

*Primary Examiner* — Kaitlin S Joerger
(74) *Attorney, Agent, or Firm* — Fish & Richardson P.C.

(57) ABSTRACT

A grabber assembly has a beam assembly with a bracket. A grabber gear assembly is coupled with the bracket. The grabber gear assembly has a pair of gear mechanisms coupled with the bracket. Each gear mechanism has a shaft and a pair of thrust bearings, one at each end of the shaft. A grabber arm mounting pad is coupled with each shaft. A gear section is coupled with each shaft. The gear sections of each shaft mesh with one another to drive the grabber arm mounting pads. An actuating driver is coupled with one of the shafts to drive the grabber gear assembly and move the arms between an open and grasping position.

20 Claims, 6 Drawing Sheets

Related U.S. Application Data continuation of application No. 17/035,204, filed on Sep. 28, 2020, now Pat. No. 11,286,110, which is a continuation of application No. 16/272,476, filed on Feb. 11, 2019, now Pat. No. 10,787,314, which is a continuation of application No. 15/606,180, filed on May 26, 2017, now Pat. No. 10,221,012.

(60) Provisional application No. 62/345,177, filed on Jun. 3, 2016.

(52) U.S. Cl.
CPC ................ *B65F 2003/0276* (2013.01); *B65F 2003/0279* (2013.01); *B65F 2003/0283* (2013.01)

(56) References Cited

U.S. PATENT DOCUMENTS 3,321,036 A 5/1967 Keenan et al.
3,762,586 A 10/1973 Updike
3,822,802 A 7/1974 Evans
3,954,194 A 5/1976 Stedman
4,042,137 A 8/1977 Hughes et al.
4,143,451 A 3/1979 Craig et al.
4,152,979 A 5/1979 Schmidt
4,175,903 A 11/1979 Carson
4,227,849 A 10/1980 Worthington
4,242,037 A 12/1980 Baumgarten
4,313,707 A 2/1982 Bingman et al.
4,401,407 A 8/1983 Breckenridge
4,413,945 A 11/1983 LaBounty
4,435,117 A 3/1984 House
4,461,607 A 7/1984 Smith
4,461,608 A 7/1984 Boda
4,575,300 A 3/1986 George
4,580,940 A 4/1986 Sheaves
4,631,777 A 12/1986 Takimoto
4,687,405 A 8/1987 Olney
4,722,270 A 2/1988 Wall
4,726,726 A 2/1988 Dossena et al.
4,889,462 A 12/1989 Naab et al.
D306,599 S 3/1990 Hunter
5,002,450 A 3/1991 Naab
5,007,786 A 4/1991 Bingman
5,020,844 A 6/1991 Pickrell
5,026,104 A 6/1991 Pickrell
5,049,026 A 9/1991 Bingman et al.
5,092,731 A 3/1992 Jones et al.
5,105,967 A 4/1992 Horpestad
5,119,894 A 6/1992 Crawford et al.
5,135,129 A 8/1992 Joly
5,209,312 A 5/1993 Jensen
5,209,537 A 5/1993 Smith et al.
RE34,292 E 6/1993 Bingman et al.
5,230,393 A 7/1993 Mezey
5,244,109 A 9/1993 Mullett et al.
5,265,311 A 11/1993 Gard
5,266,000 A 11/1993 LeBlanc, Jr.
5,308,211 A 5/1994 Bayne
5,398,983 A 3/1995 Ahrens
5,415,314 A 5/1995 McCollum
5,447,405 A 9/1995 Bayne et al.
5,474,413 A 12/1995 Georg
5,505,576 A 4/1996 Sizemore et al.
5,513,942 A 5/1996 Pickrell
5,551,824 A 9/1996 Zanzig et al.
5,562,386 A 10/1996 Browning
5,565,846 A 10/1996 Geiszler et al.
5,577,877 A 11/1996 Smith et al.
5,607,277 A 3/1997 Zopf
5,641,947 A 6/1997 Riddle, Jr.
5,651,654 A 7/1997 Christenson
D388,582 S 12/1997 Irvin, Jr.
5,702,225 A 12/1997 Ghibaudo
5,711,565 A 1/1998 Smith et al.
5,720,589 A 2/1998 Christenson et al.
5,755,547 A 5/1998 Flerchinger et al.
5,759,008 A 6/1998 Smith et al.
5,769,592 A 6/1998 Christenson
5,784,947 A 7/1998 Bayne et al.
5,807,056 A 9/1998 Osborn et al.
5,813,824 A 9/1998 Zanzig et al.
5,826,485 A 10/1998 Bayne et al.
5,833,429 A 11/1998 McNeilus et al.
5,837,945 A 11/1998 Cornwell et al.
5,846,044 A 12/1998 Smith et al.
5,863,086 A 1/1999 Christenson
5,931,628 A 8/1999 Christenson
5,934,858 A 8/1999 Christenson
5,938,394 A 8/1999 Christenson
5,967,731 A 10/1999 Brandt
5,975,604 A 11/1999 Wolin et al.
5,988,970 A 11/1999 Haltom
6,007,291 A 12/1999 Ghibaudo
6,012,895 A 1/2000 Smith et al.
6,027,299 A 2/2000 Williams
D425,528 S 5/2000 Lindgren et al.
6,095,744 A 8/2000 Harrison
6,139,244 A 10/2000 VanRaden
6,167,795 B1 1/2001 Bayne et al.
6,183,185 B1 2/2001 Zanzig et al.
6,191,691 B1 2/2001 Serrault
6,210,094 B1 4/2001 McNeilus et al.
6,213,706 B1 4/2001 Christenson
D442,757 S 5/2001 Loflin, Sr.
6,224,317 B1 5/2001 Kann et al.
6,350,098 B1 2/2002 Christenson et al.
6,390,758 B1 5/2002 McNeilus et al.
6,422,800 B1 7/2002 Reichow et al.
6,474,928 B1 11/2002 Christenson
6,494,665 B1 12/2002 Bingman
6,632,064 B1 10/2003 Walker et al.
6,644,906 B2 11/2003 Bayne
6,687,656 B2 2/2004 Durbin et al.
6,719,226 B2 4/2004 Rajewski
6,761,414 B1 7/2004 Broberg
6,761,523 B2 7/2004 Hund, Jr. et al.
6,773,054 B2 8/2004 Martini
6,821,074 B2 11/2004 Schreiber et al.
6,863,249 B1 3/2005 Alvord
7,000,289 B2 2/2006 Cedrone
7,037,061 B2 5/2006 Hund, Jr. et al.
7,066,514 B2 6/2006 Smith et al.
7,086,818 B2 8/2006 Pruteanu et al.
7,146,294 B1 12/2006 Waitkus, Jr.
7,151,231 B2 12/2006 Kamakau
7,210,890 B2 5/2007 Curotto et al.
D553,162 S 10/2007 Cazes
7,347,657 B2 3/2008 Brunn
7,390,159 B2 6/2008 Rimsa et al.
7,396,996 B1 7/2008 Shotey et al.
7,472,937 B2 1/2009 Smith et al.
D586,074 S 2/2009 Auf der Maur
7,559,735 B2 7/2009 Pruteanu et al.
7,633,020 B2 12/2009 Santi et al.
7,737,372 B2 6/2010 Dougherty, Jr. et al.
7,871,233 B2 1/2011 Arrez et al.
7,897,884 B2 3/2011 Harish
8,210,857 B2 7/2012 Huynh
D668,832 S 10/2012 Auf der Maur
D671,294 S 11/2012 Auf der Maur
D672,369 S 12/2012 Secker et al.
8,330,059 B2 12/2012 Curotto
D676,213 S 2/2013 Dyrvall et al.
D685,974 S 7/2013 Price et al.
8,550,764 B2 10/2013 Rowland et al.
8,753,062 B2 6/2014 Curotto
8,807,613 B2 8/2014 Howell et al.
8,833,823 B2 9/2014 Price et al.
9,272,843 B2 3/2016 Parker
9,624,033 B1 4/2017 Price et al.
9,834,377 B1 12/2017 Hayes et al.

(56) References Cited

U.S. PATENT DOCUMENTS

| | | | |
|---|---|---|---|
| 10,221,012 | B2 | 3/2019 | Hund, Jr. |
| 10,787,314 | B2 | 9/2020 | Hund, Jr. |
| 11,286,110 | B2 | 3/2022 | Hund, Jr. |
| 11,945,647 | B2 | 4/2024 | Hund, Jr. |
| 2001/0001637 | A1 | 5/2001 | Zanzig et al. |
| 2002/0159870 | A1 | 10/2002 | Pruteanu et al. |
| 2005/0095096 | A1 | 5/2005 | Curotto et al. |
| 2006/0127202 | A1 | 6/2006 | Tryggvason |
| 2007/0059148 | A1 | 3/2007 | Westendorf et al. |
| 2007/0278019 | A1 | 12/2007 | Santi et al. |
| 2010/0206642 | A1 | 8/2010 | Curotto |
| 2010/0281654 | A1 | 11/2010 | Curotto |
| 2011/0038696 | A1 | 2/2011 | Ummel, Jr. |
| 2011/0038697 | A1 | 2/2011 | Arrez et al. |
| 2011/0188976 | A1 | 8/2011 | Rowland et al. |
| 2011/0243692 | A1 | 10/2011 | Fortin et al. |
| 2011/0266296 | A1 | 11/2011 | Curotto |
| 2012/0273498 | A1 | 11/2012 | Curotto |
| 2013/0057007 | A1 | 3/2013 | Howell et al. |
| 2013/0285401 | A1 | 10/2013 | Price et al. |
| 2014/0023468 | A1 | 1/2014 | Fortin et al. |
| 2015/0093221 | A1 | 4/2015 | Parker |
| 2017/0138394 | A1 | 5/2017 | Gentry et al. |
| 2017/0369242 | A1 | 12/2017 | McNeilus et al. |
| 2019/0308810 | A1 | 10/2019 | Hund, Jr. |
| 2021/0214158 | A1 | 7/2021 | Hund, Jr. |
| 2023/0002153 | A1 | 1/2023 | Hund, Jr. |

FOREIGN PATENT DOCUMENTS

| | | |
|---|---|---|
| CA | 2812544 | 10/2013 |
| CA | 2788268 | 12/2013 |
| CA | 2853264 | 4/2015 |
| CA | 2969272 | 12/2017 |
| CN | 203959084 | 11/2014 |
| DE | 20312954 | 10/2003 |
| EP | 0860380 | 2/2001 |
| EP | 1321383 | 6/2003 |
| EP | 1584577 | 10/2005 |
| EP | 2420458 | 2/2012 |
| EP | 3251979 | 12/2017 |
| GB | 2082142 | 3/1982 |
| KR | 100443671 | 8/2004 |
| SE | 508998 | 11/1998 |
| WO | WO 1994/018098 | 8/1994 |
| WO | WO 1995/000420 | 1/1995 |
| WO | WO 1997/037909 | 10/1997 |
| WO | WO 2001/030671 | 5/2001 |

OTHER PUBLICATIONS

ASTbearings.com [online], "Thrust Bearings," available on or before Mar. 23, 2016, via Internet Archive: Wayback Machine URL <https://web.archive.org/web/20160323161942/https://www.astbearings.com/thrust-bearings.html>, retrieved on Sep. 12, 2022, URL <https://www.astbearings.com/thrust-bearings.html>, 1 page.

Curotto, John Michael, "Curotto Scale System Project", Dec. 1, 2006, 12 pages.

EP Communication pursuant to Article 94(3) EPC in European Application No. 17174140.8, dated Sep. 14, 2018, 5 pages.

European Office Action in European Application No. 17174140.8, dated May 10, 2017, 30 pages.

GlobalSpec.com [online], "Thrust Bearings Information," available on or before Apr. 5, 2016, via Internet Archive: Wayback Machine URL <https://web.archive.org/web/20160405223334/https://www.globalspec.com/learnmore/mechanical_components/bearings_bushings/thrust_bearings>, retrieved on Sep. 12, 2022, URL <https://www.globalspec.com/learnmore/mechanical_components/bearings_bushings/thrust_bearings>, 6 pages.

GRABBER FOR A FRONT LOADER REFUSE VEHICLE

CROSS-REFERENCE TO RELATED APPLICATIONS

This application is a continuation of U.S. application Ser. No. 17/673,542, filed on Feb. 16, 2022, which is a continuation of U.S. application Ser. No. 17/035,204, filed on Sep. 28, 2020, now U.S. Pat. No. 11,286,110, which is a continuation of U.S. application Ser. No. 16/272,476, filed on Feb. 11, 2019, now U.S. Pat. No. 10,787,314, which is a continuation of U.S. application Ser. No. 15/606,180, filed on May 26, 2017, now U.S. Pat. No. 10,221,012, which claims the benefit of U.S. Provisional Application No. 62/345,177, filed on Jun. 3, 2016. The entire disclosure of the above applications are incorporated herein by reference in their entirety.

FIELD

The present disclosure relates to refuse vehicles and, more particularly, to a grabber arm for dumping refuse carts into a container.

BACKGROUND

Various grabber types exist in the field. These grabbers appear to work satisfactory for their intended purposes. However, designers strive to improve the art. One disadvantage of existing grabbers is that they are unable to maneuver between refuse carts that are closely spaced to one another for pick up. When a consumer takes refuse carts to the curb, most will align and position their carts close together. This makes it difficult for an automatic grabber to pick up the individual closely spaced refuse carts. Accordingly, the operator must exit the vehicle to space the refuse carts apart from one another for pick up. Thus, the refuse carts may be individually picked up by the grabber and dumped into the vehicle container. The collection route down time when an operator is required to leave the vehicle is expensive to refuse collection companies.

Accordingly, the present disclosure provides the art with a grabber that enables pick up and dumping of closely spaced refuse carts with minimal exiting of the vehicle by the operator. The present disclosure provides a grabber assembly that is gear operated. The present disclosure provides positioning of the grabber arms close to one another.

SUMMARY

According to a first aspect of the disclosure, a grabber assembly comprises a beam assembly with a bracket. A grabber gear assembly is coupled with the bracket. The gear assembly comprises a pair of gear mechanisms coupled with the bracket. Each gear mechanism includes a pair of spherical thrust bearings with a shaft having two ends. One of the pair of thrust bearings is positioned at each end on the shaft. A grabber arm mounting pad is coupled with the shaft. A gear section is coupled with the shaft. The gear section of each shaft meshes with the other to drive the grabber arm mounting pads. An actuating driver is coupled with one of the shafts to drive the grabber gear assembly. One of the pair of thrust bearings is secured with the beam assembly bracket. A pair of grabber arms is coupled with each one of the grabber arm mounting pads. The pair of grabber arms is manufactured from spring steel. The actuating driver is a cushioned cylinder. A bracket extends from one of the shafts to couple with the actuating driver. The mounting pads include a bracket to secure with the shaft. The gear section may be coupled with the mounting pad bracket.

According to a second aspect of the disclosure, a refuse container and grabber arm comprises a container to receive refuse and a grabber arm to dump a refuse cart into the container. The grabber arm comprises a beam assembly with a bracket. A grabber gear assembly is coupled with the bracket. The gear assembly comprises a pair of gear mechanisms coupled with the bracket. Each gear mechanism includes a pair of spherical thrust bearings with the shaft having two ends. One of the pair of thrust bearings is positioned at each end on the shaft. A grabber arm mounting pad is coupled with the shaft. A gear section is coupled with the shaft. The gear section of each shaft meshes with the other to drive the grabber arm mounting pads. An actuating driver is coupled with one of the shafts to drive the grabber gear assembly. One of the pair of thrust bearings is secured with the beam assembly bracket. A pair of grabber arms is coupled with each one of the pair of grabber arm mounting pads. The pair of grabber arms is manufactured from spring steel. The actuating driver is a cushioned cylinder. A bracket extends from one of the shafts to couple with the actuating driver. The mounting pads include a bracket to secure with the shaft. The gear section may be coupled with the mounting pad bracket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
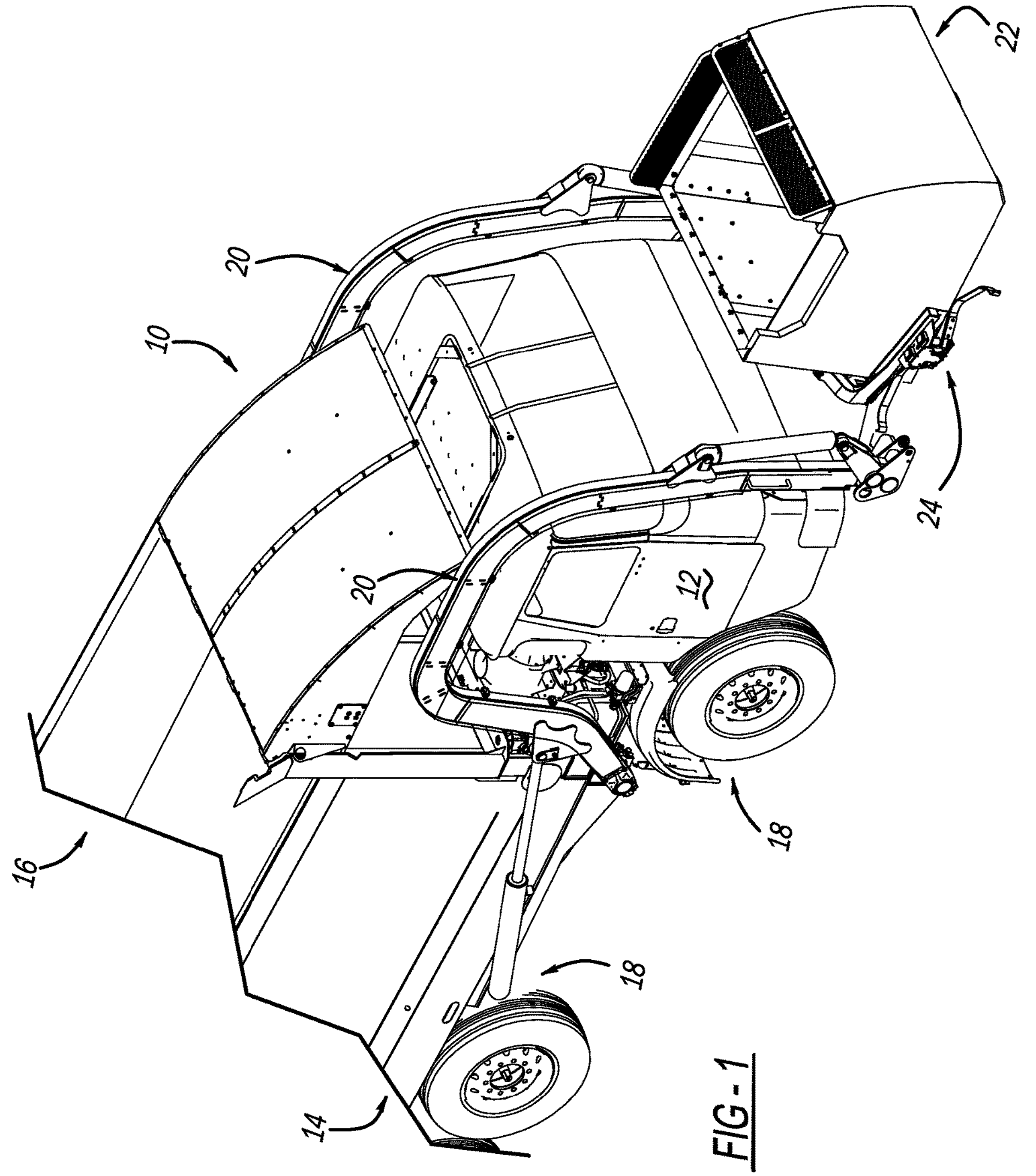
FIG. 1 is a perspective view of a truck with an intermediate can and a grabber arm assembly.

Turning to the figures, in FIG. 1 a refuse collection vehicle is illustrated and designated with the reference numeral 10. The vehicle 10 includes a cab 12 with a chassis 14 that includes a primary collecting container 16. Also, a drivetrain, including wheels 18, moves the vehicle in a conventional manner. The vehicle 10 includes front loading arms 20 that include an intermediate can 22. The intermediate can 22 includes a grabber arm assembly 24.

Figure 2:
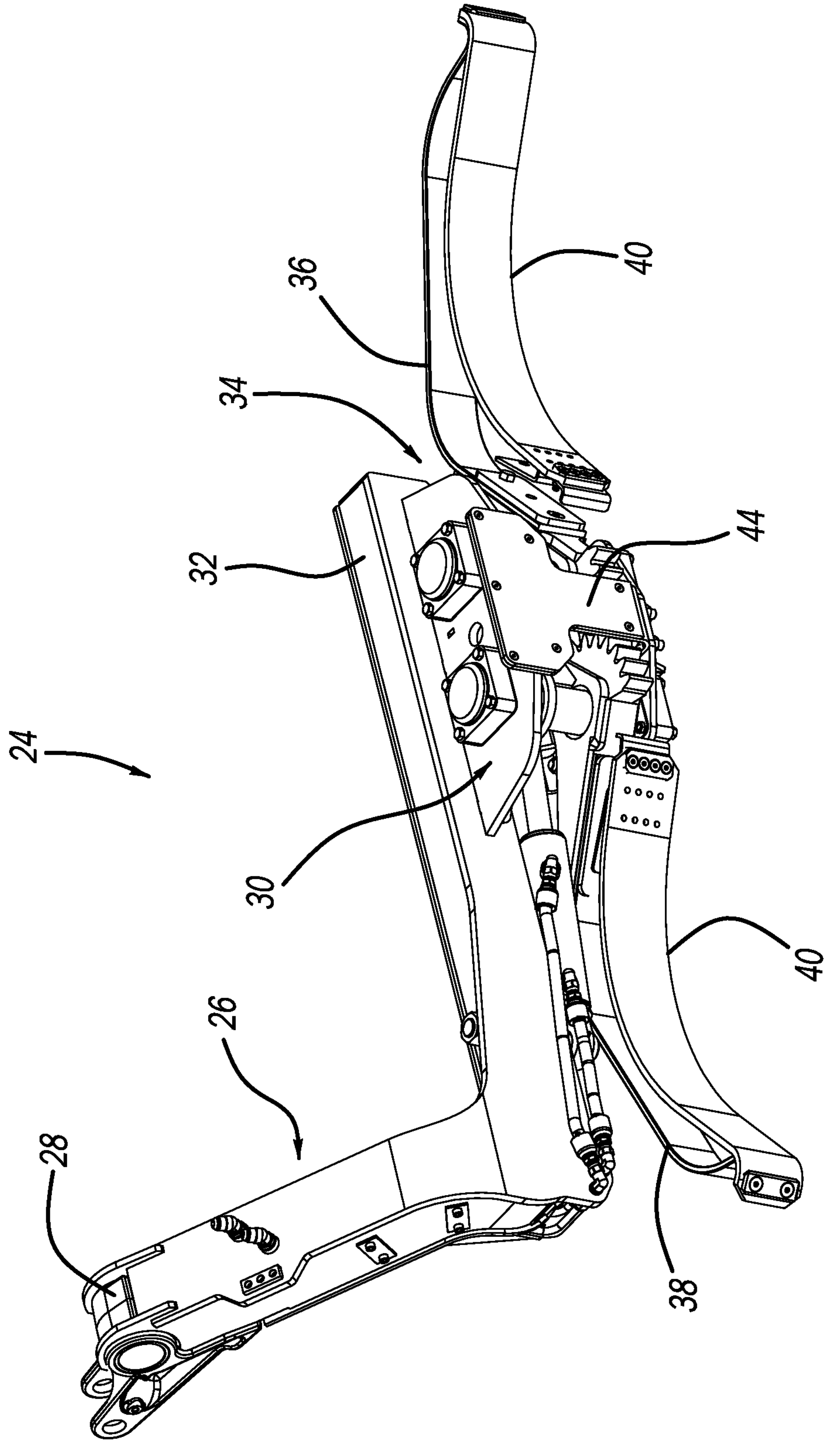
FIG. 2 is a perspective view of the grabber arm assembly.
Figure 3:
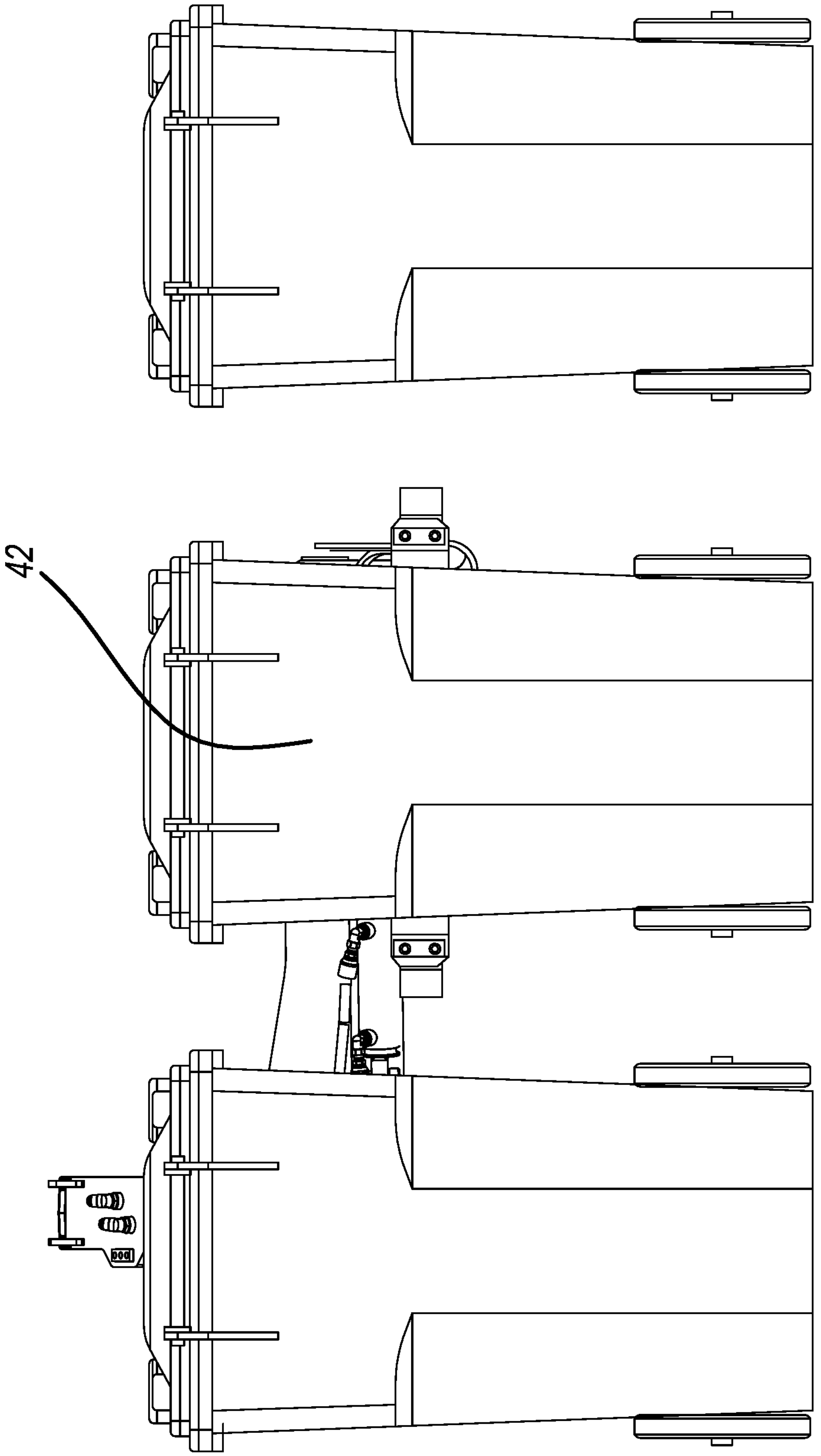
FIG. 3 is a perspective view of the grabber arm grasping a refuse cart.
Figure 4:
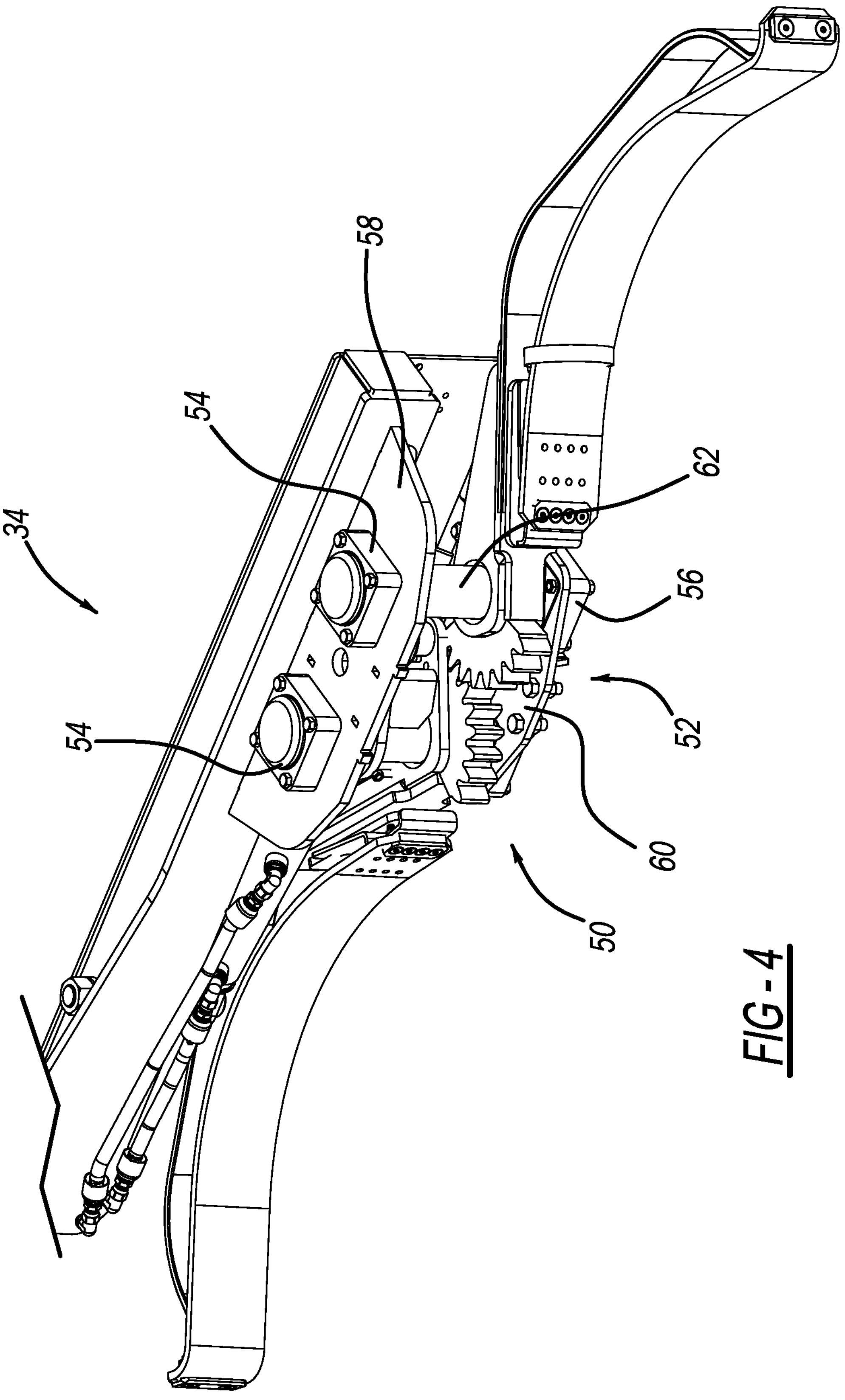
FIG. 4 is a perspective view of the grabber gear assembly with the plate removed.
Figure 5:
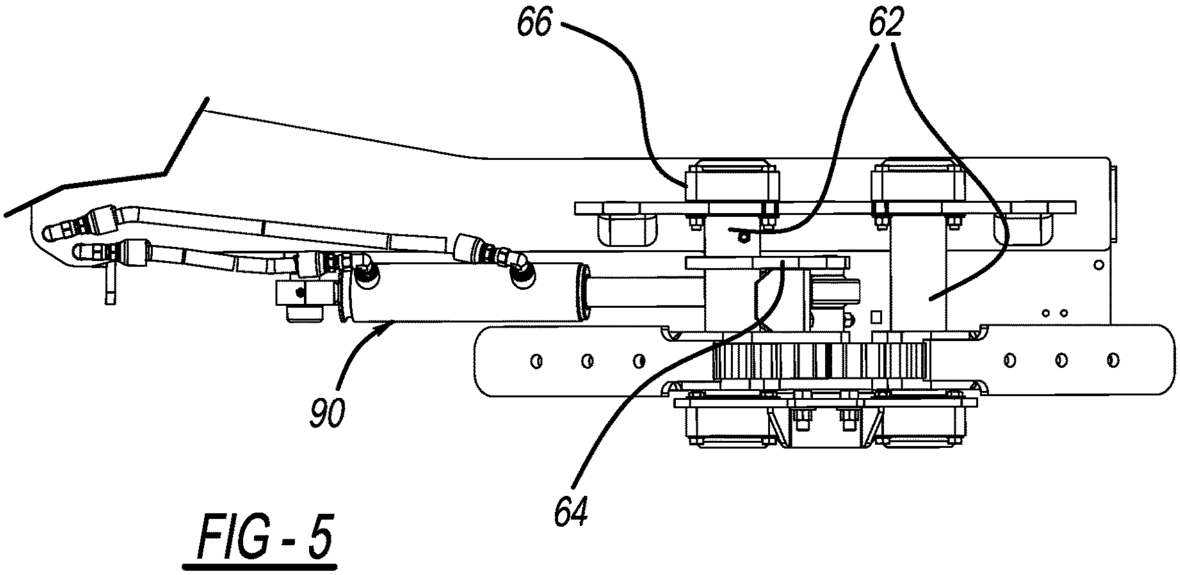
FIG. 5 is a front elevational view of the grabber gear assembly with the grabber arms, plate, and top bracket removed.
Figure 6:
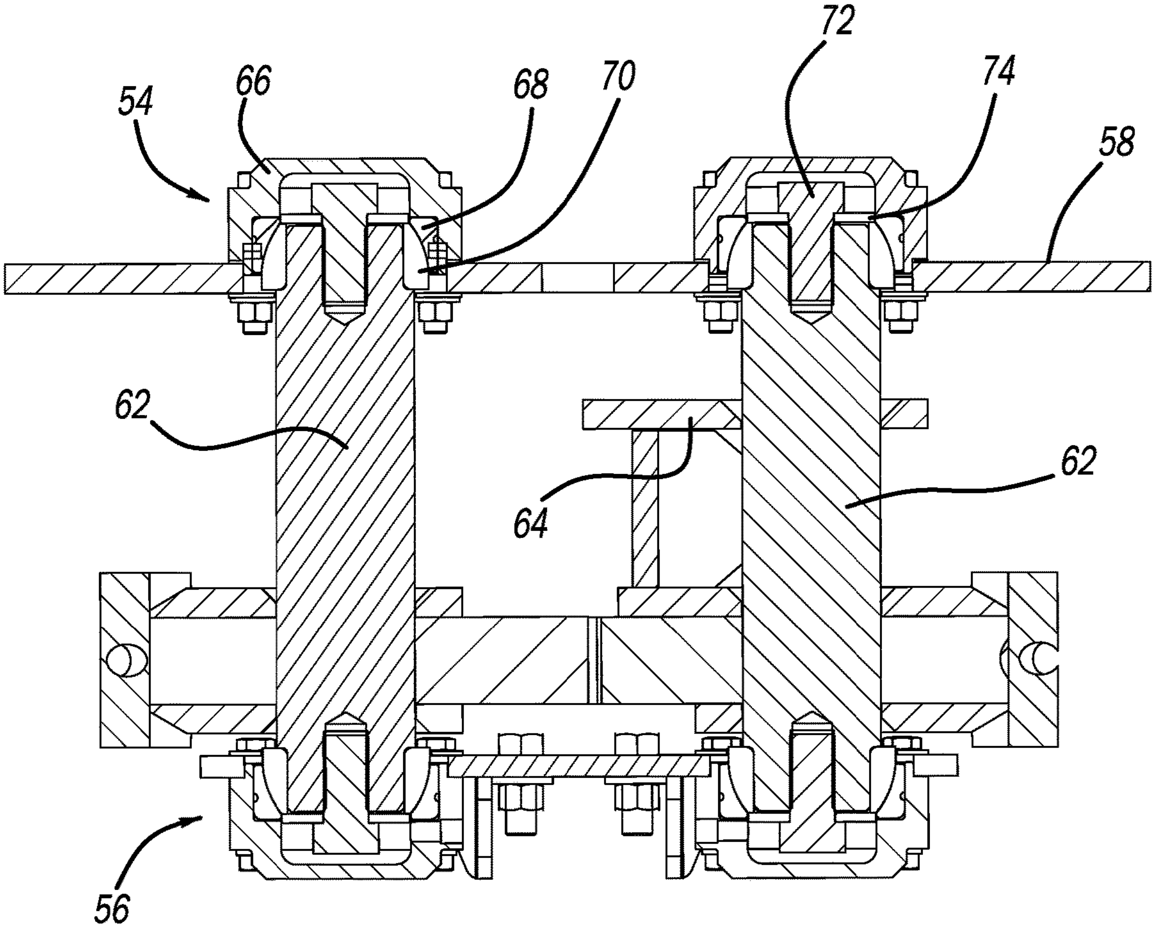
FIG. 6 is a rear elevational cross section view through FIG. 5 but including the top bracket.
Figure 7:
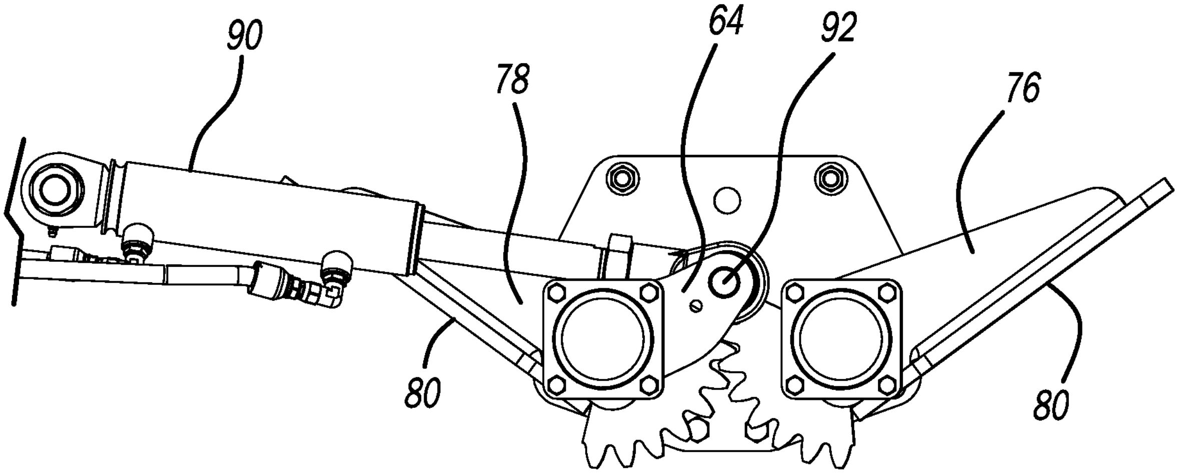
FIG. 7 is a top elevational view of the grabber gear assembly with the beam, grabber arms, plate, and top bracket removed.
Figure 8:
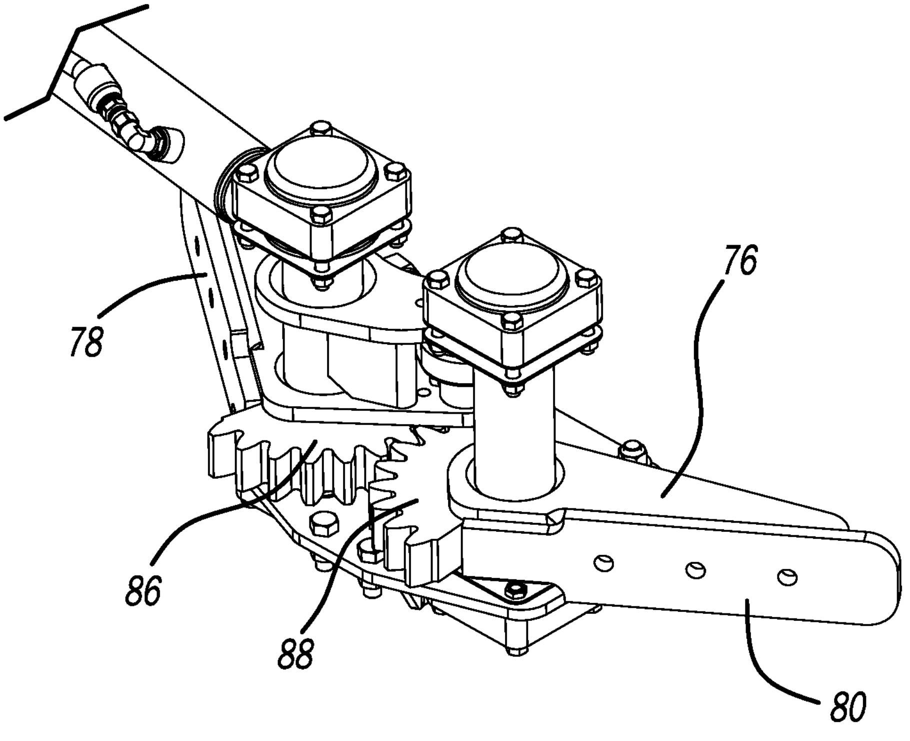
FIG. 8 is a perspective view of the grabber gear assembly with the grabber arms, plate, and top bracket removed.

Turning to FIG. 2, the grabber arm assembly 24 is illustrated. The grabber arm assembly 24 includes a beam assembly 26. The beam assembly 26 has an overall L-shape with a cylindrical bore 28 to receive a pivot pin. The cylindrical bore 28 enables the beam 26, as well as the grabber arm assembly 24, to pivot with respect to the intermediate can 22. The beam assembly 26 includes a bracket assembly 30 on one of the L-shaped legs 32. The bracket assembly 30 includes a grabber gear assembly 34 that moves the grabber arms 36, 38 between the grasping and release positions. The grabber arms 36, 38 include belt members 40. The belt members 40 contact the refuse carts 42 when grasping the refuse carts, as illustrated in FIG. 3. The arms 36, 38 are manufactured from a spring steel material. Also, a stop 44 is positioned on the bracket assembly 30 to keep gear assembly 34 from coming into contact with refuse carts 42.

Turning to FIGS. 4 through 8, a better understanding of the grabber gear assembly 34 will be obtained.

The grabber gear assembly 34 includes a pair of gear mechanisms 50, 52. The gear mechanisms 50, 52 are substantially identical and the explanation of one will apply to both. The gear mechanisms 50, 52 includes a pair of spherical thrust bearings 54, 56. The first thrust bearing 54 is secured to the first bracket plate 58. The second thrust bearing 56 is secured to the second bracket plate 60. A shaft or pivot pin 62 is positioned between the thrust bearings 54, 56. The shaft ends are connected with the thrust bearings 54, 56. One of the shafts 62 includes a driver mounting bracket 64.

The spherical thrust bearings 54, 56 can be the same or different. In the current illustration, they are the same. The thrust bearings include a housing 66, outer ring 68 and inner ring member 70. A fastener 72 abuts washer 74 which secures the ring member 70 on the shaft 62. The spherical thrust bearings 54, 56 operates in a conventional manner. The housings 66 are secured with the bracket plates 58, 60 to secure the gear mechanisms 50, 52 with the bracket assembly 30.

Each shaft 62 includes an arm pad mounting bracket 76, 78. Each arm pad mounting bracket 76, 78 includes a mounting pad 80. Shaft supports are coupled with the shaft 62 to secure the arm pad mounting brackets 76, 78 onto the shaft 62.

Gear sections 86, 88 are mounted on the shafts 62. The gear sections 86, 88 mesh with one another to provide rotational movement of the arm pad mounting supports 76, 78 which, in turn, move the arm pad mounting supports 76, 78 as well as the grabber arms 36, 38 between an opened and a grasping position.

An actuating driver 90 is coupled with the bracket 64 via a pin 92. The actuating driver 90 can be a pneumatic or hydraulic cylinder or the like. The cylinder is a cushioned cylinder. The cushion cylinder enables a smooth operation of the cylinder to enable the opening and grasping of the grabber arms 36, 38. The cylinder is retracted to close or grasp and extends to open. Thus, with the use of downstream hydraulics, any valve leakage or cylinder leakage of the pistons will cause the grabber to move the arms 36, 38 to their opened position.

The gear sections 86, 88 are used to time the grabber arms 36, 38 to enable the gear mechanisms 50, 52 to be positioned closer together by a factor of two compared with existing grabbers. This enables the beam assembly 26 to be reshaped and enable the grabber arms 36, 38 to be inserted between closely positioned refuse carts as illustrated in FIG. 3. Also, the grabber arms 36, 38, due to the spring steel, can deflect. This enables the grabber belts 40 to automatically adjust for a variety of to be picked up refuse carts. The belts 40 tensioned from the grabber arms 36, 38 are sized to create a uniform load on the refuse carts. This provides a better grip on the cart. Also, rotation of the grabber gear assembly 34 is driven in an equal rotation so that both sides of a refuse cart will experience the same amount of force. The cushioned cylinder 90, while enabling smooth operation, also reduces impact.

The self-aligning spherical thrust bearings provide a larger contact area as the arm moves from a pick up to a dump position. This permits angular misalignment and can withstand radial or heavy axial loads. This increases durability under rotational impact conditions such as lifting and dumping a refuse cart. The grabber arm may also be utilized on the chassis and dump directly into the primary container.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grabber assembly comprising:
a beam;
a first bracket plate coupled to the beam, the first bracket plate having an outer surface and an inner surface;
a second bracket plate, the second bracket plate having an outer surface and an inner surface;
a first grabber arm operatively coupled to a second grabber arm, each grabber arm comprising:
a mounting pad coupling the grabber arm to a bracket;
a shaft coupled to the mounting pad, the shaft extending between two ends and defining a longitudinal axis;
a pair of bearings, one of the bearings residing at each of the two ends of the shaft and at the outer surface of each of the first and second bracket plates; and
a gear section coupled to the shaft;
an actuating driver configured to drive the shaft of the first grabber arm and to linearly extend and retract; and
a driver mount connected to the shaft and the actuating driver and axially positioned between the first bracket plate and the gear section along the longitudinal axis such that:
linear extension of the actuating driver drives the shaft of the first grabber arm through the driver mount to rotate in a first direction that transitions the first grabber arm to an open position; and
linear retraction of the actuating driver drives the shaft of the second grabber arm through the driver mount to rotate in a second direction that transitions the first grabber arm to a closed position,
wherein the first grabber arm is configured to drive the shaft of the second grabber arm.

2. The grabber assembly of claim 1, wherein the first grabber arm is operatively coupled to the second grabber arm through the gear section.

3. The grabber assembly of claim 1, wherein a first bearing of the pair of bearings is secured to the first bracket plate, and a second bearing of the pair of bearings is secured to the second bracket plate.

4. The grabber assembly of claim 1, wherein at least a portion of the first and second grabber arms is composed of a material including spring steel.

5. The grabber assembly of claim 1, wherein the actuating driver comprises a cushioned cylinder.

6. The grabber assembly of claim 1, wherein at least one of the bearings of the pair of bearings comprises a spherical thrust bearing.

7. The grabber assembly of claim 6, wherein the spherical thrust bearing comprises a housing, an outer ring, and an inner ring, wherein the outer and inner rings reside radially inboard of an outer wall of the housing.

8. The grabber assembly of claim 7, wherein the spherical thrust bearing further comprises a first fastener connecting the housing to the bracket and a second fastener securing the outer ring on the shaft of the first or second grabber arm.

9. The grabber assembly of claim 1, wherein the actuating driver is secured to the driver mount by a pin engagement, and wherein the driver mount is directly connected to the shaft.

10. An apparatus comprising:
- a container for receiving refuse; and
- a grabber assembly comprising:
  - a beam;
  - a first bracket plate coupled to the beam, the first bracket plate having an outer surface and an inner surface;
  - a second bracket plate, the second bracket plate having an outer surface and an inner surface;
  - a first grabber arm operatively coupled to a second grabber arm, each grabber arm comprising:
    - a mounting pad coupling the grabber arm to a bracket;
    - a shaft coupled to the mounting pad, the shaft extending between two ends and defining a longitudinal axis;
    - a pair of bearings, one of the bearings residing at each of the two ends of the shaft and at the outer surface of each of the first and second bracket plates; and
    - a gear section coupled to the shaft;
  - an actuating driver configured to drive the shaft of the first grabber arm and to linearly extend and retract; and
  - a driver mount connected to the shaft and the actuating driver and axially positioned between the first bracket plate and the gear section along the longitudinal axis such that:
    - linear extension of the actuating driver drives the shaft of the first grabber arm through the driver mount to rotate in a first direction that transitions the first grabber arm to an open position; and
    - linear retraction of the actuating driver drives the shaft of the second grabber arm through the driver mount to rotate in a second direction that transitions the first grabber arm to a closed position,
  - wherein the first grabber arm is configured to drive the shaft of the second grabber arm.

11. The apparatus of claim 10, wherein the first grabber arm is operatively coupled to the second grabber arm through the gear section.

12. The apparatus of claim 10, wherein a first bearing of the pair of bearings is secured to the first bracket plate, and a second bearing of the pair of bearings is secured to the second bracket plate.

13. The apparatus of claim 10, wherein at least one of the bearings of the pair of bearings comprises a spherical thrust bearing, wherein the spherical thrust bearing comprises a housing, an outer ring, and an inner ring, and wherein the outer and inner rings reside radially inboard of an outer wall of the housing.

14. The apparatus of claim 13, wherein the spherical thrust bearing further comprises a first fastener connecting the housing to the bracket and a second fastener securing the outer ring on the shaft of the first or second grabber arm.

15. The apparatus of claim 10, further comprising a stop coupled to the first and second bracket plates.

16. A refuse collection vehicle comprising:
- a chassis with a cab and a primary collecting container and a drive train for moving the refuse collection vehicle;
- a pair of front-loading arms;
- a container for receiving refuse, the container coupled to the front-loading arms;
- a grabber assembly for dumping a refuse cart into the container, the grabber assembly comprising:
  - a beam;
  - a first bracket plate coupled to the beam, the first bracket plate having an outer surface and an inner surface;
  - a second bracket plate, the second bracket plate having an outer surface and an inner surface;
  - a first grabber arm operatively coupled to a second grabber arm, each grabber arm comprising:
    - a mounting pad coupling the grabber arm to a bracket;
    - a shaft coupled to the mounting pad, the shaft extending between two ends and defining a longitudinal axis;
    - a pair of bearings, one of the bearings residing at each of the two ends of the shaft and at the outer surface of each of the first and second bracket plates; and
    - a gear section coupled to the shaft;
  - an actuating driver configured to drive the shaft of the first grabber arm and to linearly extend and retract; and
  - a driver mount connected to the shaft and the actuating driver and axially positioned between the first bracket plate and the gear section along the longitudinal axis such that:
    - linear extension of the actuating driver drives the shaft of the first grabber arm through the driver mount to rotate in a first direction that transitions the first grabber arm to an open position; and
    - linear retraction of the actuating driver drives the shaft of the second grabber arm through the driver mount to rotate in a second direction that transitions the first grabber arm to a closed position,
  - wherein the first grabber arm is configured to drive the shaft of the second grabber arm.

17. The refuse collection vehicle of claim 16, wherein the first grabber arm is operably coupled to the second grabber arm through a gear assembly comprising a pair of gear mechanisms, each gear mechanism coupled to the shaft.

18. The refuse collection vehicle of claim 16, wherein at least one of the bearings of the pair of bearings comprises a spherical thrust bearing.

19. The refuse collection vehicle of claim 18, wherein the spherical thrust bearing comprises a housing, an outer ring, and an inner ring, wherein the outer and inner rings reside radially inboard of an outer wall of the housing.

20. The refuse collection vehicle of claim 19, wherein the spherical thrust bearing further comprises a first fastener connecting the housing to the bracket and a second fastener securing the outer ring on the shaft of the first or second grabber arm.

* * * * *